US012460343B2

(12) United States Patent
Boado Encinosa et al.

(10) Patent No.: US 12,460,343 B2
(45) Date of Patent: Nov. 4, 2025

(54) LAUNDRY APPLIANCE FILTER ASSEMBLY RETENTION LATCH

(71) Applicant: Haier US Appliance Solutions, Inc., Wilmington, DE (US)

(72) Inventors: Marla Boado Encinosa, Louisville, KY (US); David Scott Dunn, Louisville, KY (US); Wayne E. Lawson, La Grange, KY (US); Dimitar Tcholakov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 360 days.

(21) Appl. No.: 18/094,739

(22) Filed: Jan. 9, 2023

(65) Prior Publication Data

US 2024/0229344 A1 Jul. 11, 2024

(51) Int. Cl.

| | |
|---|---|
| ***D06F 58/22*** | (2006.01) |
| ***B01D 46/00*** | (2022.01) |
| ***D06F 25/00*** | (2006.01) |
| ***D06F 35/00*** | (2006.01) |

(52) U.S. Cl.

CPC ......... *D06F 58/22* (2013.01); *B01D 46/0009* (2013.01); *D06F 25/00* (2013.01); *B01D 2265/028* (2013.01); *B01D 2279/55* (2013.01)

(58) Field of Classification Search

CPC ............ B01D 46/0009; B01D 2279/55; B01D 2265/028; D06F 25/00; D06F 58/22

See application file for complete search history.

(56) References Cited

U.S. PATENT DOCUMENTS

| | | | | |
|---|---|---|---|---|
| 3,892,048 | A * | 7/1975 | Jacobsen, Jr. | D06F 58/04 34/604 |
| 10,443,180 | B2 | 10/2019 | Lee et al. | |
| 11,441,257 | B2 * | 9/2022 | Hato | D06F 58/22 |
| 12,084,807 | B2 * | 9/2024 | Mazzarella | D06F 58/22 |
| 2006/0085996 | A1 * | 4/2006 | Hwang | D06F 58/22 34/82 |
| 2006/0096335 | A1 * | 5/2006 | Park | D06F 58/22 68/20 |
| 2006/0123854 | A1 * | 6/2006 | Hong | D06F 58/22 68/24 |
| 2007/0089316 | A1 * | 4/2007 | Kim | D06F 58/04 34/82 |

(Continued)

FOREIGN PATENT DOCUMENTS

| | | |
|---|---|---|
| DE | 3538174 A1 | 4/1987 |
| EP | 2365122 B1 | 10/2012 |

(Continued)

OTHER PUBLICATIONS

"How do I clean the i-DOS detergent drawer", Bosch Home UK and Ireland, Youtube Video retrieved from: https://www.youtube.com/watch?v=NyWMP0WBAe8.

*Primary Examiner* — Benjamin L Osterhout

(74) *Attorney, Agent, or Firm* — Dority & Manning, P.A.

(57) ABSTRACT

A laundry appliance includes a cabinet. The cabinet defines an interior volume. The laundry appliance also includes an air filter assembly. The air filter assembly is positioned in the cabinet. The air filter assembly includes a latch. The latch is configured to releasably engage a housing of the laundry appliance.

17 Claims, 13 Drawing Sheets

(56) References Cited

U.S. PATENT DOCUMENTS

| | | | | |
|---|---|---|---|---|
| 2008/0148597 | A1* | 6/2008 | Kim | D06F 58/50 34/524 |
| 2011/0271543 | A1* | 11/2011 | Kim | D06F 58/22 34/90 |
| 2013/0145648 | A1* | 6/2013 | Kim | F26B 21/003 34/524 |
| 2014/0157621 | A1* | 6/2014 | Kim | F26B 21/003 34/572 |
| 2015/0252516 | A1* | 9/2015 | Cho | D06F 58/22 34/82 |
| 2022/0298717 | A1* | 9/2022 | MacDonald, III | D06F 58/22 |

FOREIGN PATENT DOCUMENTS

| | | | |
|---|---|---|---|
| WO | WO2020049818 | A1 | 3/2020 |
| WO | WO2022022170 | A1 | 2/2022 |

* cited by examiner

LAUNDRY APPLIANCE FILTER ASSEMBLY RETENTION LATCH

FIELD OF THE INVENTION

The present subject matter relates generally to laundry appliances, and more particularly to air filters for laundry appliances.

BACKGROUND OF THE INVENTION

Laundry appliances include washing machine appliances, dryer appliances, and combination laundry appliances. Combination laundry appliances, sometimes also referred to as washer/dryer appliances, provide both washing and drying functions in a single unit. During the washing and drying operations, particles from clothing articles being treated therein, such as fiber particles, are dislodged and may become entrained in the flow of air through the laundry appliance. Such particles, e.g., lint, may impair the performance of the laundry appliance's heating system if the particles are carried to, for example, a heater of the heating system, by the flow of air. Thus, laundry appliances typically include at least one air filter, sometimes also referred to as a lint filter, to entrap such particles and remove the particles from the air flow. Over time, when the entrapped particles accumulate on the air filter, the air filter may be removed from the laundry appliance in order to clean the air filter, e.g., to remove the accumulated particles.

The air filter may be provided as part of a removable air filter assembly. In some cases, it may be desirable to prevent or restrict unauthorized or unintentional removal of the air filter assembly. For example, internal parts of the laundry appliance may be exposed when the air filter assembly is removed, and it may be desired to limit access to such internal parts.

Accordingly, a laundry appliance having improved features for retaining a removable air filter assembly in the laundry appliance would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a laundry appliance is provided. The laundry appliance includes a cabinet that defines an interior volume with a tub mounted within the interior volume of the cabinet. A laundry basket is rotatably mounted within the tub. The laundry basket defines a chamber for the receipt of articles for treatment. The laundry appliance also includes a heating system in thermal communication with the chamber whereby heated air flows from the heating system to the chamber. The laundry appliance further includes a housing positioned within the interior volume of the cabinet. An air filter assembly is removably positioned in the housing between the laundry basket and the heating system upstream of the heating system, whereby a flow of return air from the chamber passes through and is filtered by an air filter of the air filter assembly before flowing to the heating system. The air filter assembly includes a latch configured to releasably engage the housing.

In another aspect of the present disclosure, a laundry appliance is provided. The laundry appliance includes a cabinet that defines an interior volume. An air filter assembly is positioned in the cabinet. The air filter assembly includes a latch configured to releasably engage a housing of the laundry appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
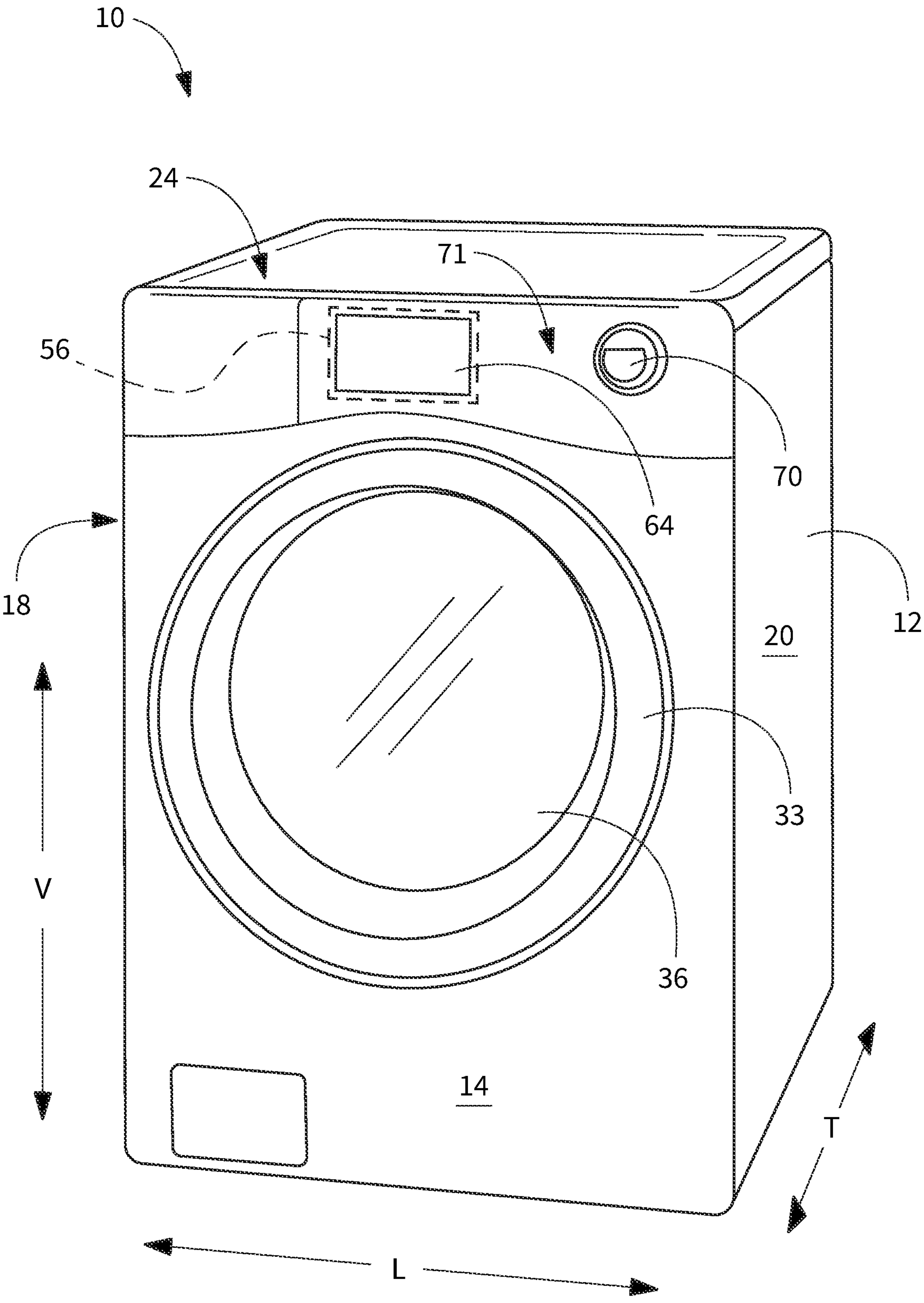
FIG. 1 provides a perspective view of a laundry appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "substantially," "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "articles," "clothing," or "laundry" include but need not be limited to fabrics, textiles, garments, linens, papers, or other items which may be cleaned, dried, and/or otherwise treated in a laundry appliance. Furthermore, the term "load" or "laundry load" refers to the combination of clothing that may be washed together in a washing machine appliance or dried together in a dryer appliance (e.g., clothes dryer), including washed and dried together in a combination laundry appliance, and may include a mixture of different or similar articles of clothing of different or similar types and kinds of fabrics, textiles, garments and linens within a particular laundering process.

Figure 2:
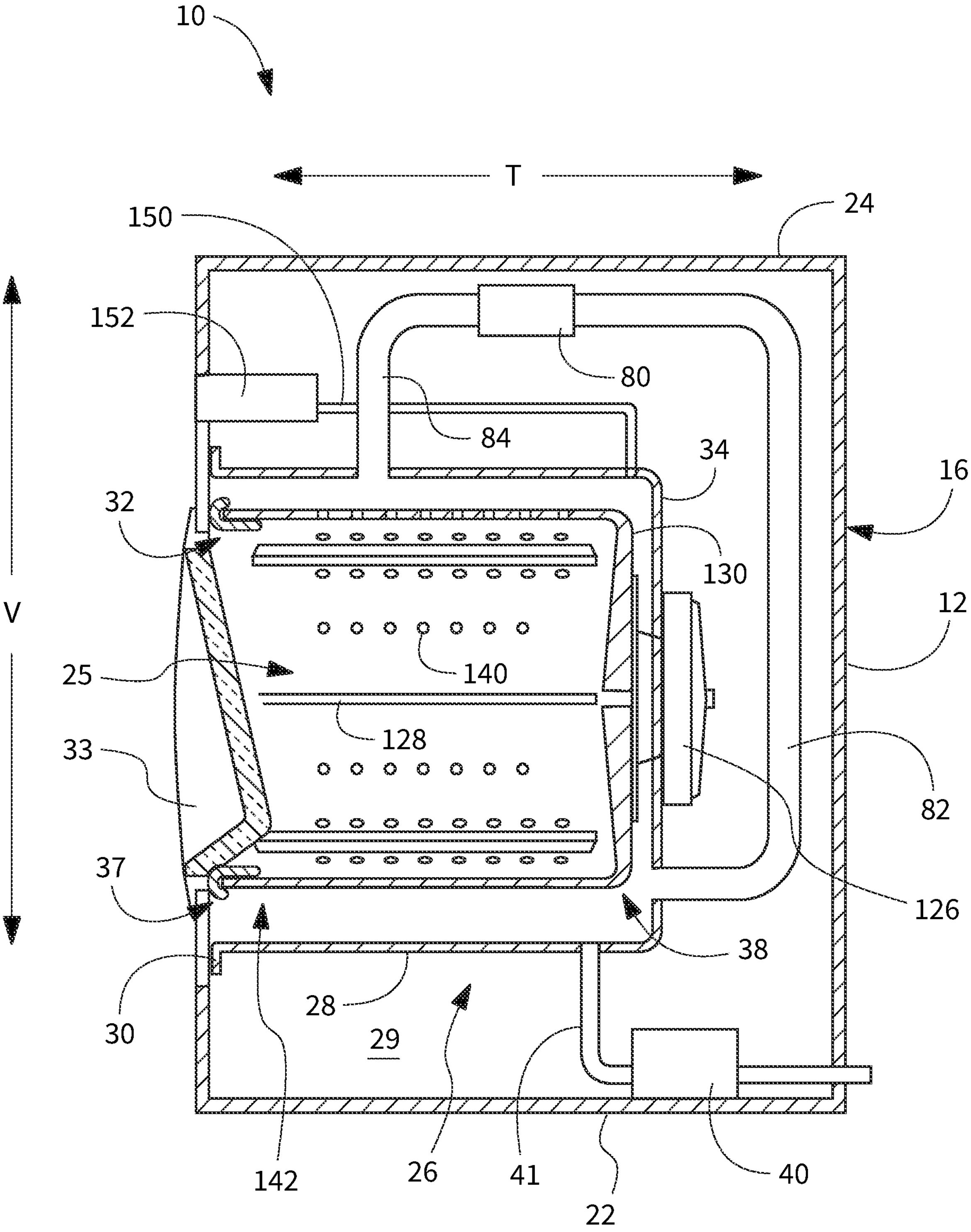
FIG. 2 provides a schematic cross-section view of the example laundry appliance of FIG. 1.
Figure 3:
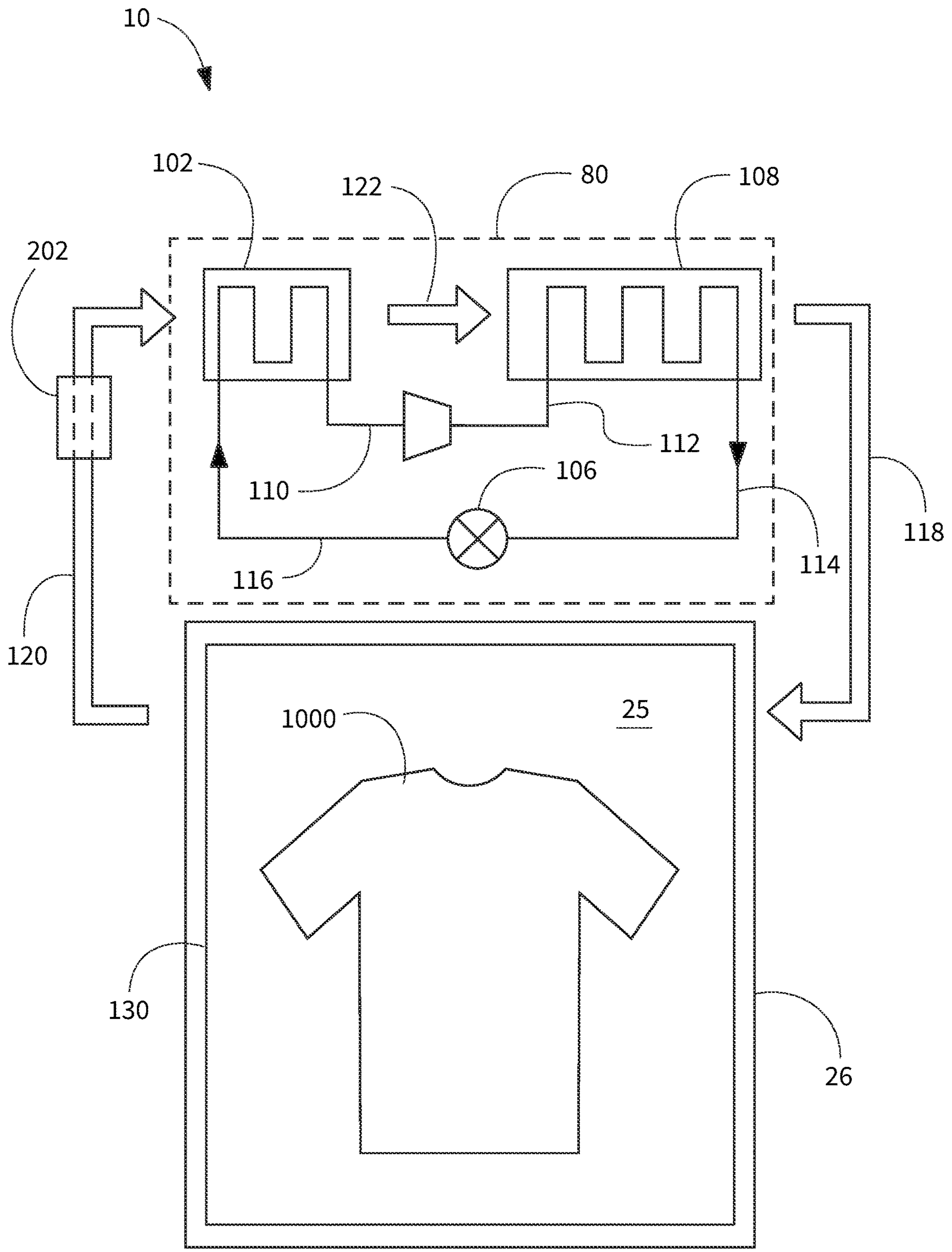
FIG. 3 provides a schematic diagram of an exemplary heat exchange heating system of the example laundry appliance of FIG. 1 according to one or more embodiments of the present disclosure.
Figure 4:
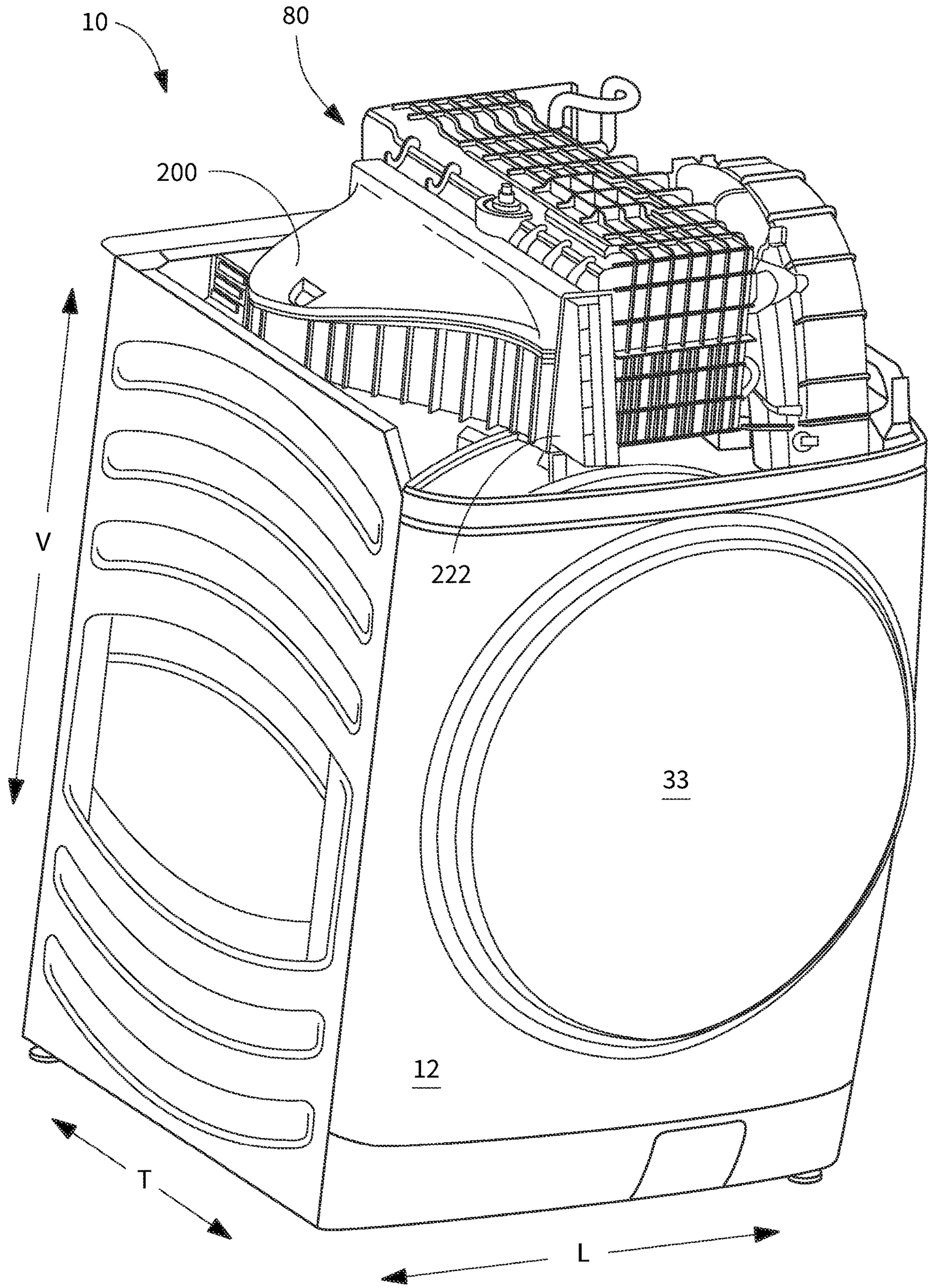
FIG. 4 provides a perspective view of the laundry appliance of FIG. 1 with a portion of a cabinet thereof removed to show internal components of the laundry appliance in accordance with one or more exemplary embodiments of the present disclosure.
Figure 5:
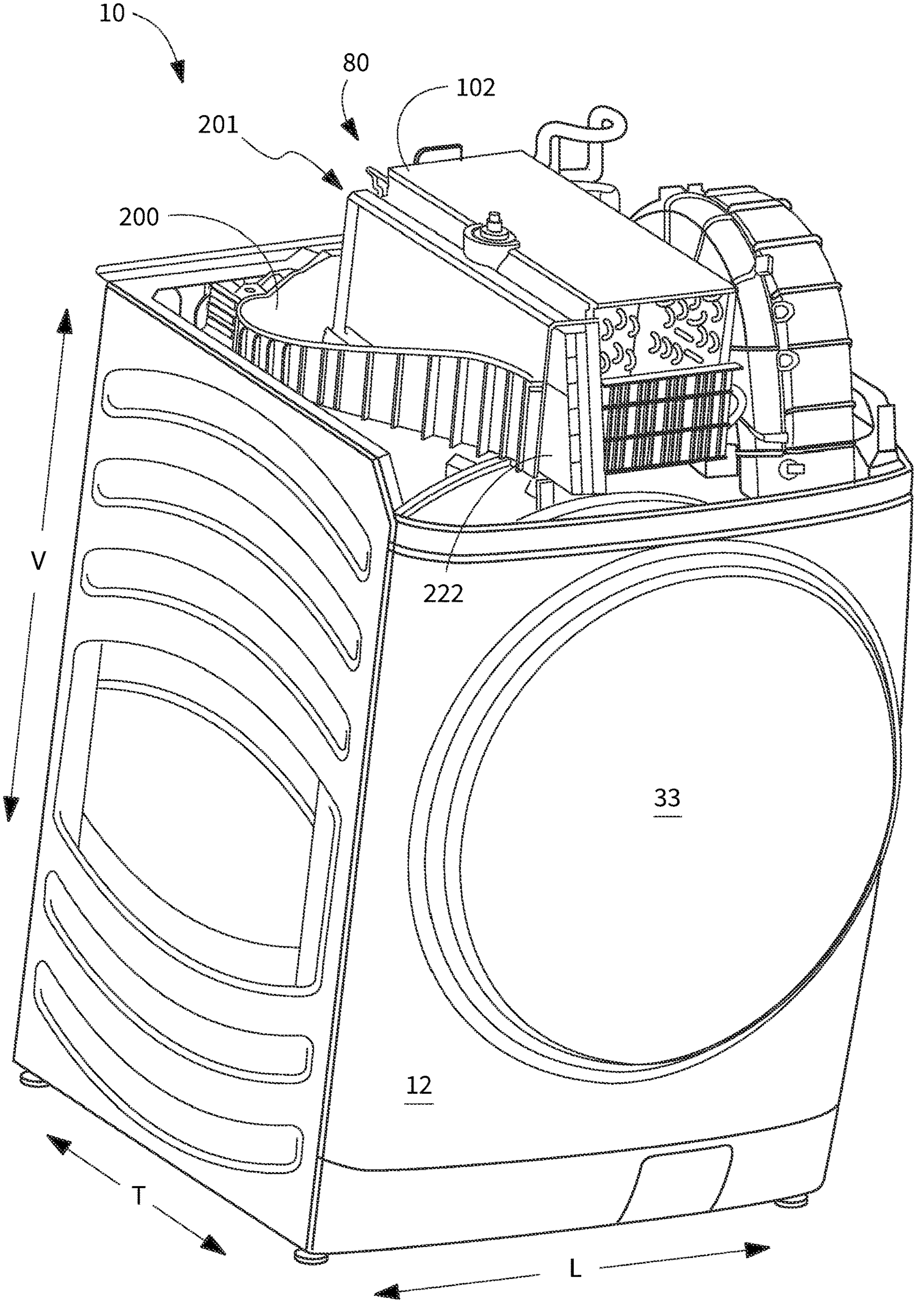
FIG. 5 provides another perspective view of the laundry appliance of FIG. 1 with portions of a housing of the laundry appliance removed to show an air filter assembly and a heating system therein in accordance with one or more exemplary embodiments of the present disclosure.

Embodiments of the present disclosure include a laundry appliance, e.g., a combination washer/dryer appliance, such as the example combination appliance 10 illustrated in FIGS. 1 through 5. FIG. 1 provides a perspective view of a laundry appliance 10 according to exemplary embodiments of the present disclosure. The laundry appliance 10 is a combination laundry appliance, and may also be referred to as a multifunction laundry appliance or washer/dryer combination appliance. FIG. 2 provides a section view of laundry appliance 10. FIG. 3 provides a schematic illustration of a heat pump heating system which may be incorporated into the laundry appliance 10. FIGS. 4 and 5 provide additional perspective views of the laundry appliance 10. The laundry appliance 10 generally defines a vertical direction V, a lateral direction L, and a transverse direction T, each of which is mutually perpendicular, such that an orthogonal coordinate system is defined. While described in the context of a specific embodiment of laundry appliance 10, using the teachings disclosed herein, it will be understood that laundry appliance 10 is provided by way of example only. Other laundry appliances having different appearances and different features may also be utilized with the present subject matter as well.

Cabinet 12 includes a front panel 14, a rear panel 16, a left side panel 18 and a right side panel 20 spaced apart from each other by front and rear panels 14 and 16, a bottom panel 22, and a top cover 24. As used herein, terms such as "left" and "right" or "front" and "back" refer to directions from the perspective of a user facing the laundry appliance 10 for accessing and/or operating the laundry appliance 10. For example, a user stands in front of the laundry appliance 10, e.g., at or near the front panel 14, to access door 33 and/or inputs 70 (the door 33 and inputs 70 are described in more detail below). Within cabinet 12, an interior volume 29 is defined. A drum or tub 26 is mounted within the interior volume 29. A laundry basket 130 is mounted within the tub 26. The laundry basket 130 defines a chamber 25 for receipt of articles of clothing for treatment, e.g., washing, rinsing, spinning, tumbling, and/or drying.

In some embodiments, one or more selector inputs 70, such as knobs, buttons, touchscreen interfaces, etc., may be provided or mounted on the cabinet 12, e.g., on a control panel 71 thereof and are in operable communication (e.g., electrically coupled or coupled through a wireless network band) with a processing device or controller 56. The control panel 71 may also include a display 64. Controller 56 may also be provided in operable communication with various components of the laundry appliance, such as the motor, blower, and/or heating system 80. In turn, signals generated in controller 56 direct operation of such components in response to the inputs 70. As used herein, "processing device" or "controller" may refer to one or more microprocessors, microcontroller, application-specific integrated circuits (ASICS), or semiconductor devices and is not restricted necessarily to a single element. The controller 56 may be programmed to operate laundry appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Tub 26 extends between a front portion 37 and a back portion 38. Tub 26 is generally cylindrical in shape, having an outer cylindrical wall 28 and a front flange or wall 30 that defines an opening 32 of tub 26, e.g., at front portion 37 of tub 26, for loading and unloading of articles into and out of a chamber 25 defined by and within a laundry basket 130 inside of the tub 26. Tub 26 includes a rear wall 34 opposite the front flange 30. A door 33 provides for closing or accessing tub 26 through opening 32. A window 36 (FIG. 1) may be provided in door 33 for viewing of the chamber 25 and/or laundry articles therein, e.g., during operation of the laundry appliance 10.

Laundry basket 130 is rotatably mounted within tub 26 such that the laundry basket 130 is rotatable about an axis of rotation. According to the illustrated embodiment, the axis of rotation is substantially parallel to the transverse direction T. In this regard, laundry appliance 10 is generally referred to as a "horizontal axis" or "front load" laundry appliance 10. However, it should be appreciated that aspects of the present subject matter may be used within the context of a vertical axis or top load laundry appliance as well.

Laundry appliance 10 includes a motor assembly 126 that is in mechanical communication with laundry basket 130 to selectively rotate laundry basket 130. The motor assembly 126 may be a pancake motor, as illustrated, or any other suitable type, size, or configuration of motor may be used to rotate laundry basket 130 according to various embodiments. For example, a motor, such as a brushless DC motor, may be mounted within the cabinet 12 and the motor may be coupled to the laundry basket 130 by a belt and pulley, whereby the motor rotates the laundry basket 130 through the belt and pulley.

Laundry basket 130 may define one or more agitator features that extend into chamber 25 to assist in agitation and cleaning of articles disposed within laundry chamber 25 during operation of laundry appliance 10. For example, as illustrated in FIG. 2, a plurality of ribs 128 extends from laundry basket 130 into chamber 25. In this manner, for example, ribs 128 may lift articles disposed in laundry basket 130 during rotation of laundry basket 130, such as during an agitation or rinse portion of a wash operation of the laundry appliance 10. During a drying operation of the laundry appliance 10, the ribs 128 may also lift articles in the chamber 25 of the laundry basket 130 and then allow such articles to tumble back to a bottom of laundry basket 130 as laundry basket 130 rotates.

As illustrated for example in FIG. 2, laundry basket 130 may also include a plurality of perforations 140 extending therethrough in order to facilitate fluid communication between chamber 25 and tub 26, e.g., whereby wash liquid may flow between the tub 26 and the chamber 25 during a wash operation or cycle and/or heated air may flow into the chamber 25 and moisture-laden air may flow out of the chamber 25 during a drying operation or cycle. A sump 142 is defined by tub 26 outside of laundry basket 130 at a bottom of the tub 26 along the vertical direction V. Thus, sump 142 is configured for receipt of, and generally collects, wash liquid (the wash liquid may include, e.g., water, and may also includes additives such as detergents, etc.) during wash operations of laundry appliance 10. For example, during a wash operation of laundry appliance 10, wash liquid may be urged (e.g., by gravity) from the chamber 25 within the laundry basket 130 to sump 142 through the plurality of perforations 140. A pump assembly 40 is located beneath tub 26 for gravity assisted flow when draining tub 26 (e.g., via a drain 41). Pump assembly 40 is also configured for recirculating wash liquid within tub 26.

In some embodiments, laundry appliance 10 includes an additive dispenser or spout 150. For example, spout 150 may be in fluid communication with a water supply (not shown) in order to direct fluid (e.g., clean water) into tub 26. Spout 150 may also be in fluid communication with the sump 142. For example, pump assembly 40 may direct wash liquid disposed in sump 142 to spout 150 in order to circulate wash liquid in tub 26.

As illustrated, a detergent dispenser drawer 152 may be slidably mounted within front panel 14. Detergent dispenser drawer 152 receives an additive (e.g., detergent, fabric softener, bleach, or any other suitable liquid or powder) and directs the additive to chamber 25 during operation of laundry appliance 10. According to the illustrated embodiment, detergent dispenser drawer 152 may also be fluidly coupled to spout 150 to facilitate the complete and accurate dispensing of the additive.

In exemplary embodiments, during operation of laundry appliance 10, laundry items are loaded into laundry basket 130 through opening 32, and an operation is initiated through operator manipulation of input selectors 70. For example, a wash cycle may be initiated such that tub 26 is filled with water, detergent, or other fluid additives (e.g., via spout 150). One or more water valves (not shown) can be controlled by laundry appliance 10 to provide for filling laundry basket 130 to the appropriate level for the amount of articles being washed or rinsed. By way of example, once laundry basket 130 is properly filled with fluid, the contents of laundry basket 130 can be agitated (e.g., with ribs 128) for an agitation phase of laundry items in laundry basket 130. During the agitation phase, the basket 130 may be motivated about the axis of rotation at a set speed (e.g., a tumble speed) by a motor. As the basket 130 is rotated, articles within the basket 130 may be lifted by ribs 128 and permitted to drop therein due to gravity.

After the agitation phase of the washing operation is completed, tub 26 can be drained. Laundry articles can then be rinsed (e.g., through a rinse cycle) by again adding fluid to tub 26, depending on the particulars of the cleaning cycle selected by a user. Ribs 128 may again provide agitation within laundry basket 130. One or more spin cycles may also be used. In particular, a spin cycle may be applied after the wash cycle or after the rinse cycle in order to wring wash liquid from the articles being washed. During a spin cycle, basket 130 is rotated at relatively high speeds. For instance, basket 130 may be rotated at one set speed (e.g., a pre-plaster speed) before being rotated at another set speed (e.g., a plaster speed). As would be understood by those of ordinary skill in the art, the pre-plaster speed may be greater than the tumble speed and the plaster speed may be greater than the pre-plaster speed. Moreover, agitation or tumbling of articles may be reduced as basket 130 increases its rotational velocity such that the plaster speed maintains the articles at a generally fixed position relative to basket 130.

After the spin cycle, a drying operation may begin. A supply duct 82 may be mounted to tub 26 and may extend between tub 26 and a heating assembly or system 80, whereby the tub 26 is downstream of the heating system 80 along the supply duct 82 such that the heating system 80 supplies heated air that has been heated by the heating system 80 to the tub 26 via the supply duct 82. A return duct 84 may also be mounted to the tub 26 and may extend between tub 26 and the heating system 80 whereby the tub 26 is upstream of the heating system 80 along the return duct 84 such that the heating system 80 receives relatively warm and humid air from the tub 26 via the return duct 84, e.g., air returns to the heating system 80 from the tub 26, e.g., after flowing over and around articles within the chamber 25, through the return duct 84. In some embodiments, e.g., as illustrated in FIGS. 2 and 3, the heating system 80 may be positioned above the tub 26 and the return duct 84 may be oriented generally along the vertical direction V, and the return duct 84 may also be referred to as a chimney. The supply duct 82 may be mounted to the tub 26, e.g., at the rear wall 34 thereof as in the illustrated example, or the supply duct 82 may be mounted to the cylindrical wall 28 of the tub 26, such as above the basket 130, similar to the return duct 84 in the illustrated example embodiment.

The heating system 80, may include, e.g., a resistance heating element, a gas burner, and/or a heat pump, such as the example heat pump embodiment illustrated in FIG. 3 and described in more detail below, or any other suitable heat source. Moisture-laden, warm air is drawn from tub 26 by an air handler, such as a blower fan, which generates a negative air pressure within the chamber 25. As the air passes from the blower fan, it enters return duct 84 and then is passed into heating system 80. Heated air (with a lower moisture content than was received from tub 26), exits heating system 80 and is supplied to tub 26 by supply duct 82. After the clothing articles have been dried, they are removed from the chamber 25 via opening 32.

Turning now to FIG. 3, a schematic view of selected components of one or more exemplary embodiments of laundry appliance 10 is provided. In particular, FIG. 3 illustrates components used during drying operations of the laundry appliance 10. It is understood that, except as otherwise indicated, laundry appliance 10 in FIG. 3 may include some or all of the features described herein with respect to FIGS. 1, 2, 4, and 5.

In operation, one or more laundry articles 1000 may be placed within the chamber 25 of laundry basket 130. Hot dry air 118 may be supplied to chamber 25 whereby moisture within laundry articles 1000 may be drawn from the laundry articles 1000 by evaporation, such that warm saturated air 120 may flow from chamber 25 to an evaporator 102 of the heating system 80, e.g., via the return duct 84 illustrated in FIG. 2. As air passes across evaporator 102, the temperature of the air is reduced through heat exchange with refrigerant that is vaporized within, for example, coils or tubing of evaporator 102. This vaporization process absorbs both the sensible and the latent heat from the moisture-laden air-thereby reducing its temperature. As a result, moisture in the air is condensed and such condensate may be drained from heating assembly 80, as will be understood by those of ordinary skill in the art.

Air passing over evaporator 102 becomes drier and cooler than when it was received from tub 26 of laundry appliance 10. As shown, cool dry air 122 from evaporator 102 is subsequently caused to flow across a condenser 108 (e.g., across coils or tubing of the condenser 108), which condenses refrigerant therein. The refrigerant enters condenser 108 in a gaseous state at a relatively high temperature and pressure compared to the cool, dry air 122 from evaporator 102. As a result, heat energy is transferred to the air at the condenser section 108, thereby elevating the temperature of the air and providing hot dry air 118 for supply to the tub 26 of laundry appliance 10, e.g., via the supply duct 82 illustrated in FIG. 2. The hot dry air 118 passes over and around laundry articles 1000 within the chamber 25 inside of the tub 26, such that warm saturated air 120 is generated, as mentioned above. For example, the hot dry air may circulate around and through the articles 1000 while the articles 1000 are tumbled within the chamber 25 such as by rotating the basket 130, and the tumbling may be promoted by ribs 128 as well. Because the air is recycled through tub 26 and heating system 80, e.g., in a closed-loop as mentioned above, laundry appliance 10 can have a much greater efficiency than traditional clothes dryers where warm, moisture-laden air is exhausted to the environment.

As shown in FIG. 3, some embodiments of heating system 80 include a compressor 104 that pressurizes refrigerant (i.e., increases the pressure of the refrigerant) supplied by a suction line 110 and generally motivates refrigerant through the sealed refrigerant circuit of heating system 80. Compressor 104 may be in operable communication with controller 56 and is generally designed to pressurize a gas phase refrigerant. Accordingly, in order to avoid damage, refrigerant in suction line 110 is supplied to the compressor 104 in a gas phase from the evaporator section 102. The pressurization of the refrigerant with compressor 104 increases the temperature of the refrigerant (e.g., as directed by controller 56). The compressed refrigerant is fed from compressor 104 to condenser 108 through line 112. As relatively cool air 122 from the evaporator 102 is passed over the condenser 108, the refrigerant is cooled and its temperature is lowered as heat is transferred to the air for supply to tub 26.

Upon exiting condenser 108, the refrigerant is fed through line 114 to an expansion device 106. Although only one expansion device 106 is shown, such is by way of example only. It is understood that multiple such devices may be used. In the illustrated example, expansion device 106 is a thermal expansion valve. In additional embodiments, any other suitable expansion device, such as a capillary tube, may be used as well as or instead of the thermal expansion valve 106. Expansion device 106 lowers the pressure of the refrigerant and controls the amount of refrigerant that is allowed to enter the evaporator 102 via line 116. Importantly, the flow of liquid refrigerant into evaporator 102 is limited by expansion device 106 in order to keep the pressure low and allow expansion of the refrigerant back into the gas phase in the evaporator 102. The evaporation of the refrigerant in the evaporator 102 converts the refrigerant from its liquid-dominated phase to a gas phase while cooling and drying the air 120 from tub 26. The process is repeated as air is circulated through tub 26 and between evaporator 102 and condenser 108 while the refrigerant is cycled through the sealed refrigerant circuit, as described above.

The laundry appliance 10 may include an air filter 202, e.g., positioned between the tub 26 and the heating system 80 with the air filter 202 upstream of the heating system 80, whereby air flowing from the chamber 25 passes through and is filtered by the air filter 202 before flowing to the heating system 80.

As mentioned, the air filter 202 filters the air, e.g., the air filter 202 may remove particles such as lint particles from the air, as well as dust, hair, or other airborne matter, as will be understood by those of ordinary skill in the art. Accordingly, such particles may accumulate on and in the air filter 202, and in particular on an outer surface or upstream surface of the air filter 202, over time. If left unchecked, such accumulated particles may eventually obstruct air flow through the filter 202, resulting in reduced efficiency or performance of the air filter 202 and/or the laundry appliance 10, such as the heating system 80 of the laundry appliance 10. Thus, the air filter 202 may be user accessible, e.g., to permit a user to clean the air filter 202.

FIG. 4 provides a perspective view of laundry appliance 10 with a portion, e.g., an upper portion such as top cover 24, of the cabinet 12 thereof removed to reveal a housing 200 of the laundry appliance 10. As illustrated in FIGS. 4 and 5, the heating system 80 may be enclosed within a housing 200. In FIG. 5 in particular, an upper portion, e.g., upper half, of the housing 200 is also removed, e.g., in addition to the portion of the cabinet 12. As may thus be seen in FIG. 5, the heating system 80 may include a heat exchanger, e.g., evaporator 102 (see, e.g., FIG. 3) and an air filter assembly 201 may be positioned between the laundry basket 130 and the heating system 80. The air filter 202 may be a part of the air filter assembly 201.

In various embodiments, the air filter assembly 201 may include one or more air filters or filter media therein. For example, the air filter assembly 201 may include a first filter or lint filter, such as a mesh filter or screen filter, at an upstream side 240 (FIG. 6) of the air filter assembly 201 and a second filter at a downstream side 242 of the air filter assembly 201. In some exemplary embodiments, the air filter 202 may be the second filter of the air filter assembly 201, e.g., in combination with a first filter in the air filter assembly 201.

For example, the air filter assembly 201 and the air filter 202 therein may be positioned upstream of the heating system 80, such as upstream of the evaporator 102 of the heating system 80, e.g., where the evaporator 102 is the furthest upstream portion or component of the heating system 80, e.g., the first component of the heating system 80 to receive a flow of warm, moist air from the chamber 25. With the air filter 202 so positioned, a flow of return air 120 (FIG. 3) from the chamber 25 may pass through and may be filtered by the air filter 202 before flowing to the heating system 80. For example, the air filter 202 may include a porous or air-permeable material, such as a foam material, which permits air to flow therethrough while trapping particles above a specified size therein. The air filter 202 and/or air filter assembly 201 may be removable from the housing 200. For example, the air filter assembly 201 may also include a handle 222, e.g., on an outer end of the air filter assembly 201, such as an outer end of a shell 208 (FIG. 6) thereof, and the handle 222 may be grasped by a user to extract the air filter assembly 201 from the housing 200.

Figure 6:
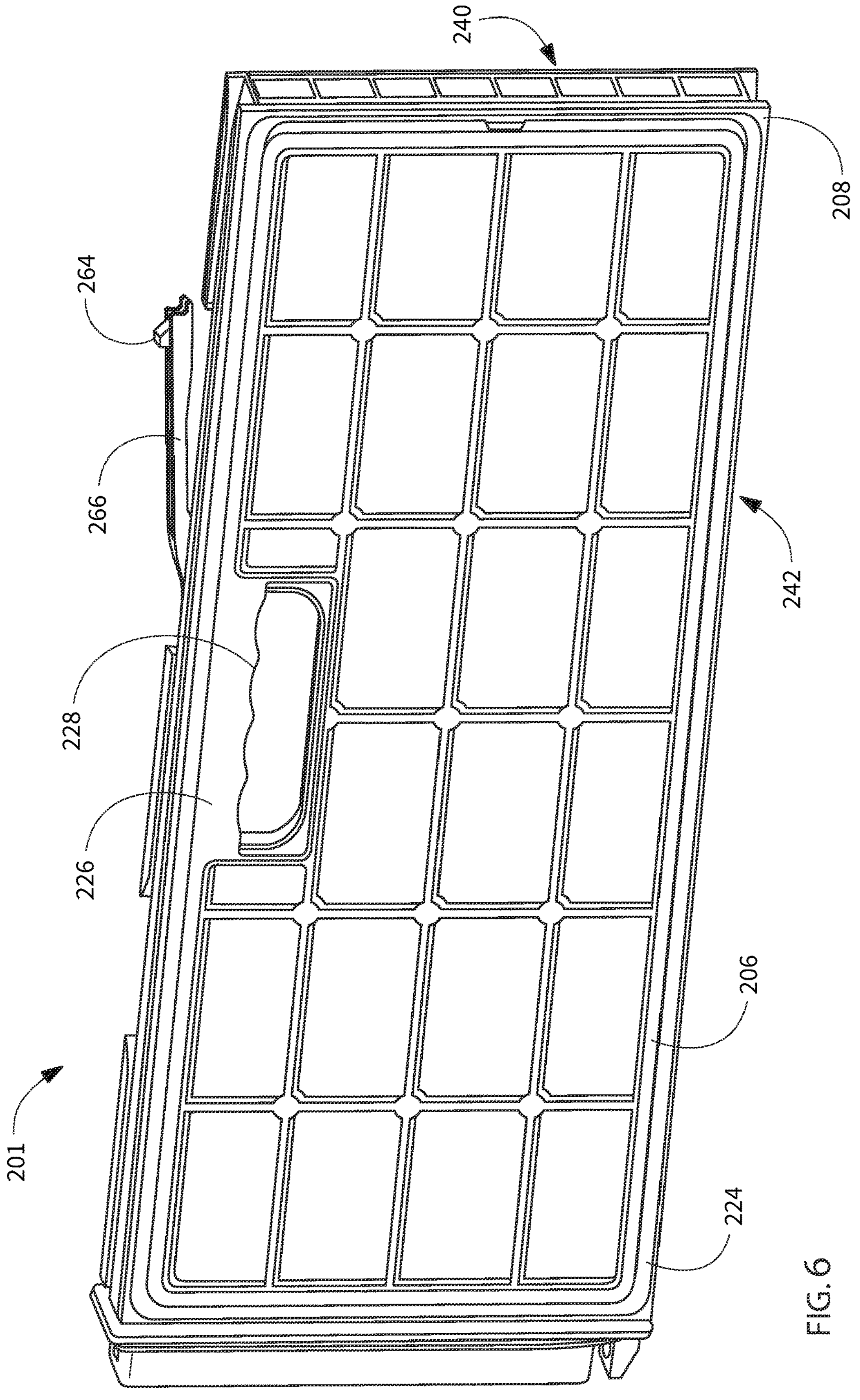
FIG. 6 provides a perspective view of an air filter assembly which may be usable with a laundry appliance such as the exemplary laundry appliance of FIG. 1.

FIG. 6 provides a perspective view of an exemplary air filter assembly 201 according to one or more embodiments of the present disclosure. As illustrated in FIG. 6, the air filter assembly 201 may include an outer shell 208 which interfaces with the housing 200 and a frame 206 mounted in the shell 208. The handle 222 is omitted from FIG. 6 in order to more clearly depict additional elements of the air filter assembly 201, nevertheless, it should be understood that the handle 222 would be attached to the shell 208 at the left side of the page in FIG. 6 if the handle 222 were illustrated in FIG. 6. The air filter 202 may be mounted to the frame 206. For example, the frame 206 may be releasably mounted in the shell 208 and/or the air filter 202 may be releasably mounted to the frame 206, such as to remove the air filter 202 and/or frame 206 for cleaning, e.g., to remove accumulated dust, lint, and/or other similar particles which may become entrapped in or on the air filter 202 over time after use. For example, the air filter 202 may be removed from the air filter assembly 201, e.g., after taking the air filter assembly 201 out of the housing 200.

In some embodiments, e.g., as illustrated in FIG. 6, the air filter assembly 201 may also include a latch 264. The latch 264 is illustrated in an as-manufactured position in FIG. 6, which will be described in more detail below. For example, the latch 264 may be mounted on, such as integrally joined to, a cantilevered arm 266. In some embodiments, the cantilevered arm 266 may be joined to the shell 208 of the air filter assembly 201. For example, the shell 208 may include a perimetrical flange 270 extending across the shell 208, such as across an outer perimeter of the shell 208 or at least a portion of the outer perimeter of the shell 208. In some embodiments, the shell 208 (including the flange 270 thereof), the cantilevered arm 266, and the latch 264 may be integrally formed as a single unitary piece, such as formed of a single piece of molded thermoplastic and/or polymeric material, e.g., injection molded plastic material.

Also as may be seen in FIG. 6, the air filter assembly 201 may further include a gasket 224, e.g., on the shell 208 and surrounding the air filter 202. The air filter 202 and/or air filter assembly 201 may include an upstream side 240 (FIG. 6) and a downstream side 242, e.g., with respect to the flow of return air from the chamber 25 to the heating assembly 80. For example, the downstream side 242 of the air filter 202 and/or air filter assembly 201 may be proximate to and face towards the heating system 80, whereas the upstream side 240 may be opposite the downstream side 242, e.g., the upstream side may be the farthest side of the air filter assembly 201 from the heating system 80 and may face away from the heating system 80, such as towards the return duct 84. For example, the gasket 224 may be disposed on the downstream side 242 of the air filter assembly 201, e.g., whereby the gasket 224 sealingly engages the heating system 80 when the air filter assembly 201 is in an installed position within the housing 200.

Figure 7:
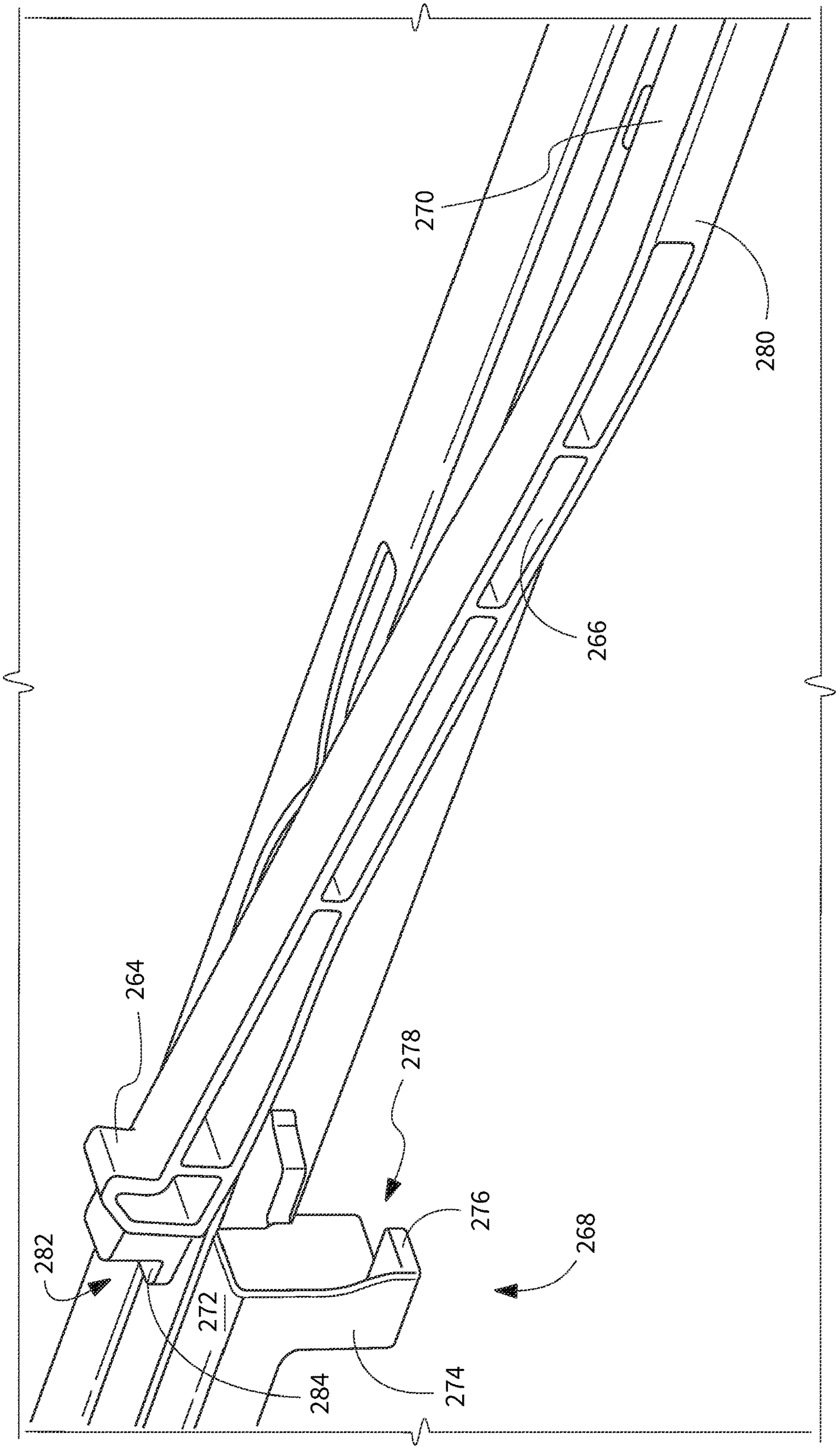
FIG. 7 provides an enlarged perspective view of a portion of the air filter assembly of FIG. 6.
Figure 8:
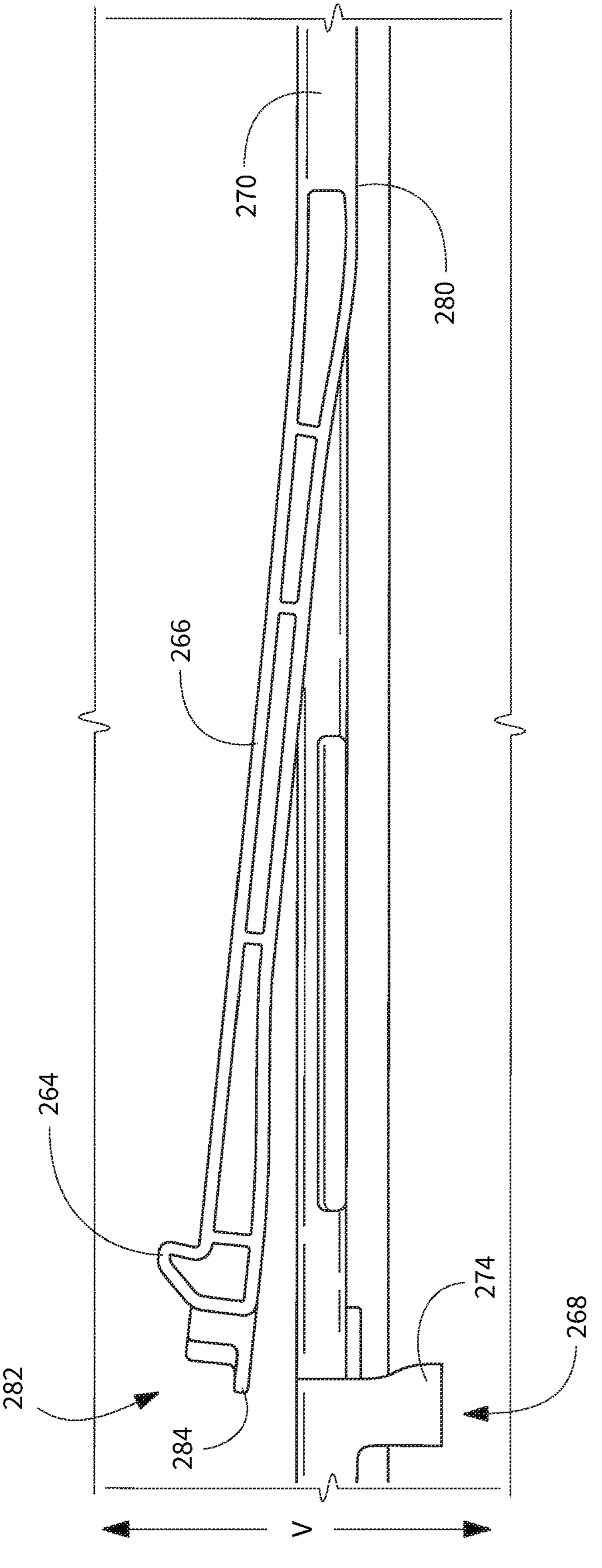
FIG. 8 provides an elevation view of the portion of the air filter assembly illustrated in FIG. 7.
Figure 10:
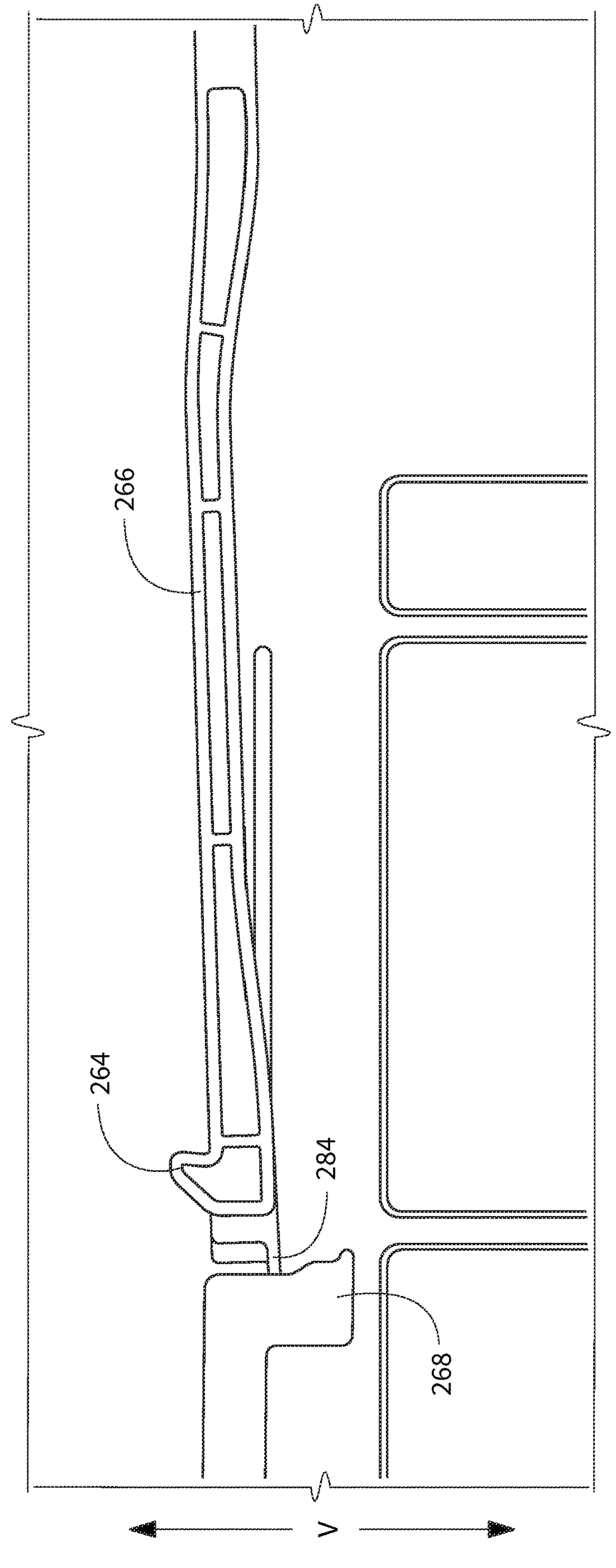
FIG. 10 provides an elevation view of the portion of the air filter assembly illustrated in FIG. 7 with a latch in a locked position.

FIG. 7 provides an enlarged perspective view of a portion of the air filter assembly 201. FIG. 8 provides an enlarged side view of a portion of the air filter assembly 201. In particular, FIGS. 7 and 8 illustrate a portion of the shell 208 with the cantilevered arm 266 extending from the shell 208, where the cantilevered arm 266 is in an as-manufactured position. For example, the cantilevered arm 266 may be manufactured at the same time as, e.g., integrally formed with, the shell 208, and may be manufactured in an extended or raised position, e.g., where the cantilevered arm 266 extends above a top of the shell 208 (see, e.g., FIG. 6). The cantilevered arm 266 may subsequently be installed in a retention box 268, e.g., in an installed position such as is illustrated in FIG. 10. The retention box 268 may restrain or limit travel of the cantilevered arm 266. For example, upward movement of the cantilevered arm 266 along the vertical direction V may be limited by the retention box 268, whereby the cantilevered arm 266 is held in tension within the retention box 268, e.g., the cantilevered arm 266 and the latch 264 thereon may be biased into or towards the installation position illustrated in FIG. 10, which may also be a locked position, e.g., a position in which the latch 264 is configured to engage the housing 200 and thereby prevent or limit removal of the air filter assembly 201 from the housing 200. For example, the material memory of the cantilevered arm 266 may urge the cantilevered arm 266 towards the as-manufactured position, thereby biasing the arm 266 into the installation position and/or locked position when the arm 266 is constrained within the retention box 268.

Figure 9:
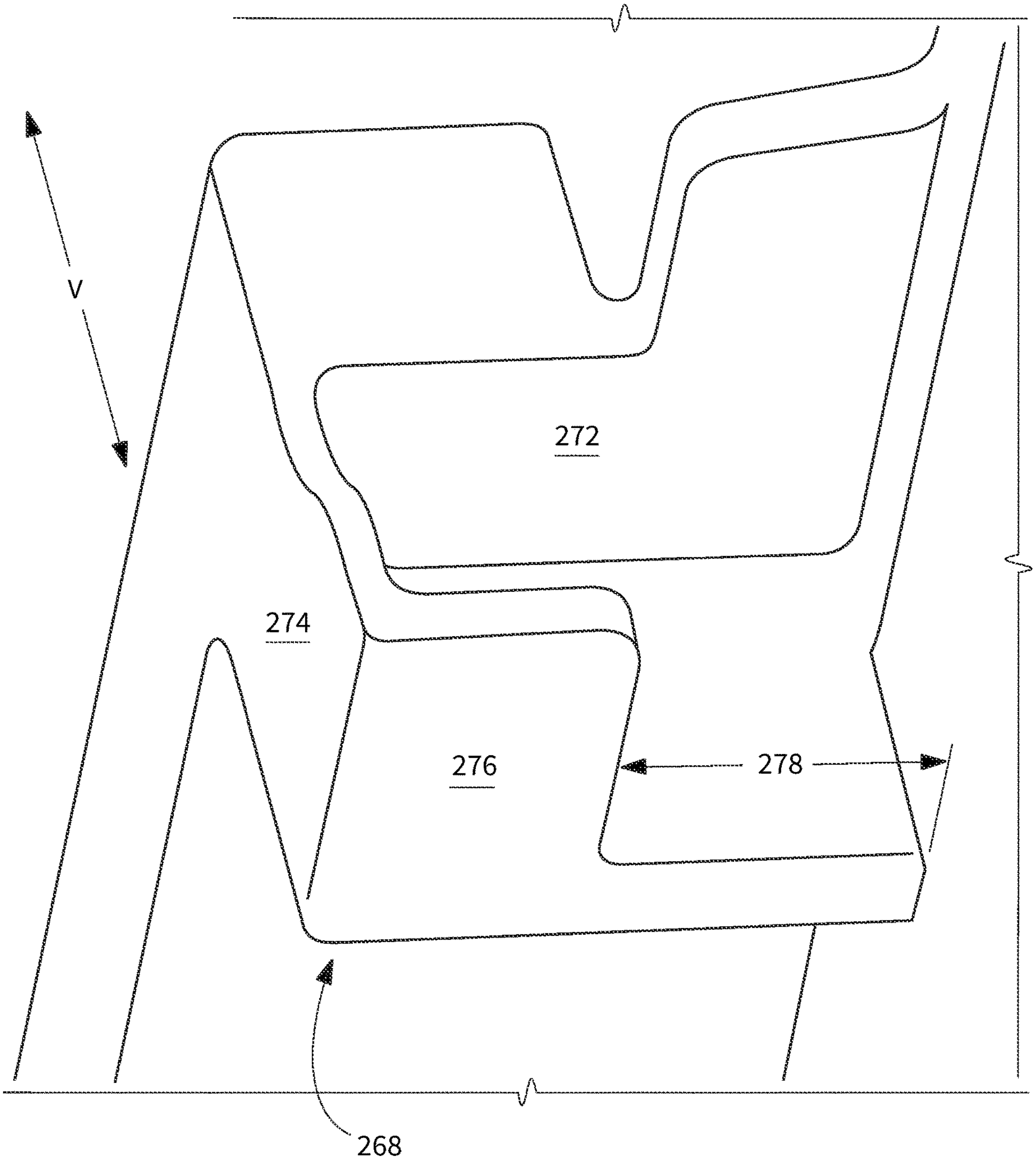
FIG. 9 provides another enlarged perspective view of a portion of the air filter assembly of FIG. 6.

FIG. 9 provides an enlarged perspective view of a portion of the air filter assembly 201 including an exemplary retention box 268 thereof. As may be seen, e.g., in FIGS. 7 through 9, the retention box 268 may include a plurality of walls, where each wall limits movement of the cantilevered arm 266. For example, two or more of the walls of the retention box 268 may be mutually generally perpendicular, such as a first wall and a second wall generally perpendicular to the first wall, where the first wall adjoins the second wall, and the first wall and the second wall thereby at least partially define the retention box 268 of the air filter assembly 201.

In some embodiments, the air filter assembly 201 may include a top wall 272. The top wall 272 may be one of a plurality of walls of the retention box 268. The top wall 272 may limit the movement, e.g., upward generally along the vertical direction V, of the cantilevered arm 266. For example, the retention box 268 may also include a bottom wall 276, e.g., the bottom wall 276 may be opposite the top wall 272 about a center of the retention box 268 along the vertical direction V. The bottom wall 276 and the top wall 272 may be spaced apart generally along the vertical direction V, e.g., such that the bottom wall 276 and the top wall 272 collectively define a vertical dimension, e.g., height, of the retention box 268 and thereby define upper and lower vertical limits of travel for the cantilevered arm 266 when the arm 266 is engaged with the retention box 268.

In some embodiments, the retention box 268 may further include an outer wall 274. The outer wall 274 may extend between the top wall 272 and the bottom wall 276, such as from the top wall 272 to the bottom wall 276, such as from a first end point defined at an intersection with one of the top wall 272 and the bottom wall 276 to a second end point defined at an intersection with the other of the top wall 272 and the bottom wall 276. The outer wall 274 may be spaced apart from and generally parallel to a side of the air filter assembly, such as the upstream side 240 or the downstream side 242 of the air filter assembly 201, whereby movement generally perpendicular to the vertical direction V, e.g., generally along the lateral direction L, of the cantilevered arm 266 is limited by the outer wall 274 and the shell 208, e.g., when the cantilevered arm 266 is engaged with the retention box 268 and the air filter assembly 201 is installed in the housing 200. For example, the outer wall 274 may restrict movement of the cantilevered arm 266 and/or the latch 264 thereon away from the shell 208 of the air filter assembly 201, such as outwards from the shell 208 in the upstream or downstream direction.

In some embodiments, the cantilevered arm 266 may extend longitudinally from a proximal end 280 which adjoins, e.g., is integrally joined to, the flange 270, to a distal end 282. The distal end 282 of the cantilevered arm 266 may be a free end, e.g., the distal end 282 may, in some embodiments, not be joined or fixed to the shell 208 or other portions of the air filter assembly 201, other than indirectly via the remainder of the cantilevered arm 266. For example, the cantilevered arm 266 may, in some embodiments, not be joined to the other portions of the air filter assembly 201, such as the shell 208, at the distal end 282. The longitudinal direction of the cantilevered arm may be parallel to a travel direction, such as the air filter assembly 201 may be configured to translate in the travel direction between an inserted position in the housing 200 and an extracted position at least partially outside of the housing 200, and the cantilevered arm 266 may extend, e.g., from the proximal end 280 to the distal end 282, generally parallel to the travel direction, such as when the cantilevered arm 266 is in the locked position.

In some embodiments, the cantilevered arm 266 may include a tongue 284 at the distal end 282. When the cantilevered arm 266 is in the locked position, the tongue 284 may be received in the retention box 268. In such embodiments, the cantilevered arm 266 may be moved from the as-manufactured position (e.g., FIGS. 7 and 8) to the locked position (e.g., FIG. 10) by rotating and twisting the arm 266 such that the tongue 284 passes through an opening 278 in the retention box 268 and the tongue 284 thereby enters the retention box 268 through the opening 278. For example, in some embodiments, the opening 278 may be defined by and between the bottom wall 276 of the retention box 268 and the shell 208, e.g., as may be seen in FIG. 9.

Figure 11:
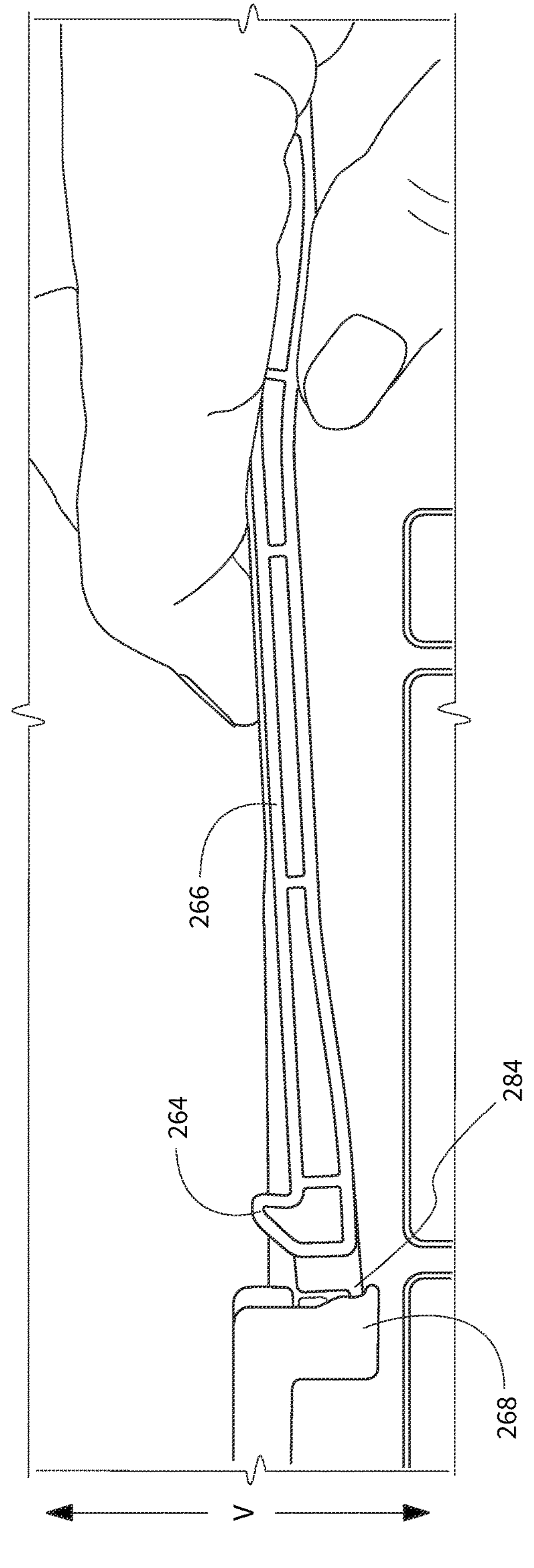
FIG. 11 provides an elevation view of the portion of the air filter assembly illustrated in FIG. 7 with the latch in a release position.

As mentioned above, FIG. 10 illustrates the cantilevered arm 266 and the latch 264 thereon in an installation or locked position, e.g., a position in which the air filter assembly 201 may be locked within the housing 200 or at least partially in the housing 200 by engagement of the latch 264 with the housing 200. FIG. 11 provides a similar illustration, where the cantilevered arm 266 and the latch 264 thereon are in a release position, such as a position to which the cantilevered arm 266 may be moved, e.g., by a user's finger as illustrated. In some embodiments, the housing 200 may include a filter gate 218 (FIG. 13) through which the air filter assembly 201 may be inserted into and/or removed from the housing 200. The release position, e.g., as illustrated in FIG. 11, may permit removal of the air filter assembly 201 from the housing 200, such as the latch 264 may be clear of the filter gate 218, e.g., entirely below an edge of the housing 200 which defines a top of the filter gate 218, when in the release position, whereby the air filter assembly 201 may be removed from the housing 200 through the gate 218 without the latch 264 engaging the housing 200. For example, in some embodiments, the cantilevered arm 266 and the latch 264 thereon may be movable between the locked position (e.g., FIG. 10) and the release position (e.g., FIG. 11) over an actuation distance, such as generally along the vertical direction V. Also as noted above, the bottom wall 276 and the top wall 272 may define upper and lower vertical limits of travel for the cantilevered arm 266 within the retention box 268, such as the actuation distance may be defined by and between the bottom wall 276 and the top wall 272 of the retention box 268.

Figure 12:
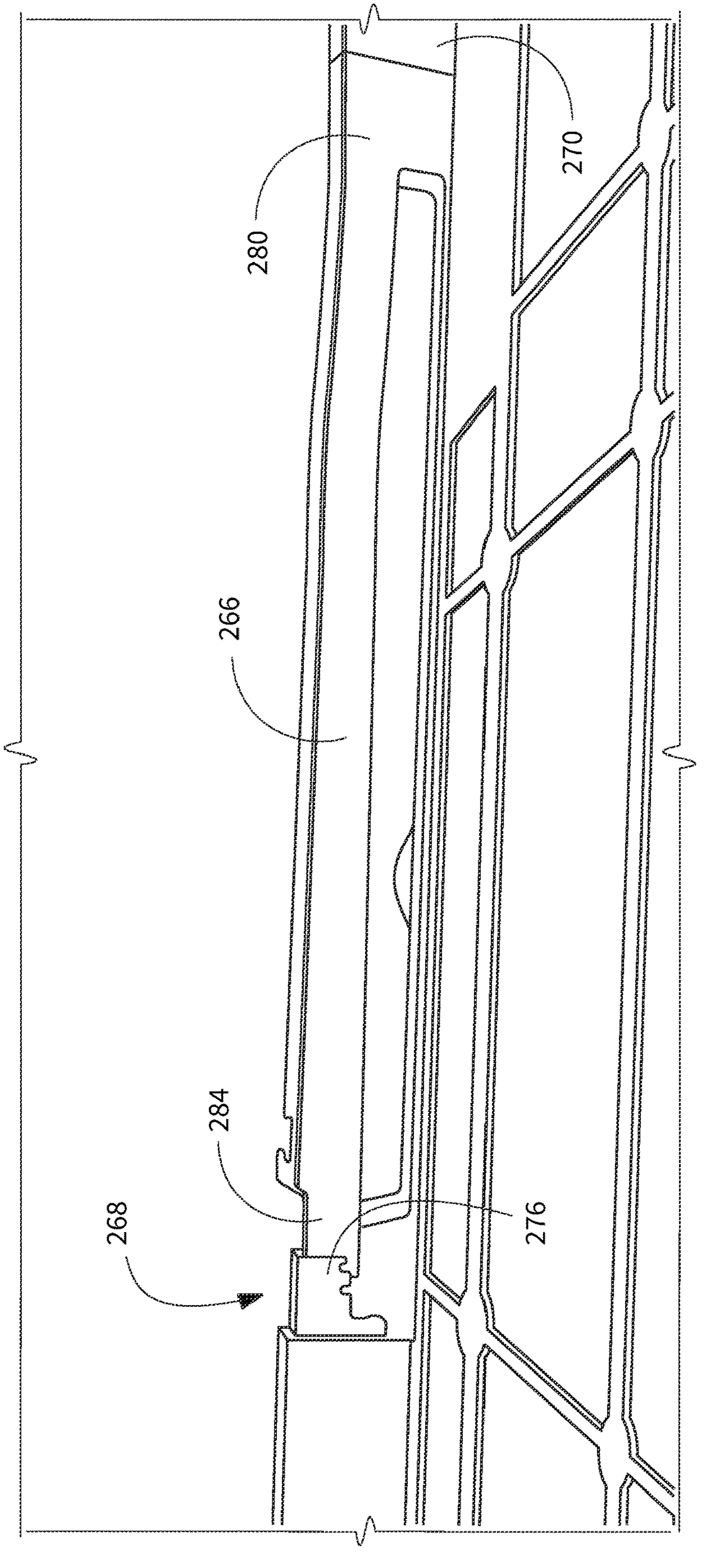
FIG. 12 provides a bottom view of the portion of the air filter assembly illustrated in FIG. 10.

As may be seen, for example, in FIG. 12 which is a view looking up at the retention box 268, the bottom wall 276 of the retention box 268 may constrain vertical movement of the cantilevered arm 266, such as by engaging the tongue 284 on the distal end 282 thereof. For example, the bottom wall 276 may define a lower limit of a range of motion of the cantilevered arm 266, such as a lower limit of the actuation distance.

Figure 13:
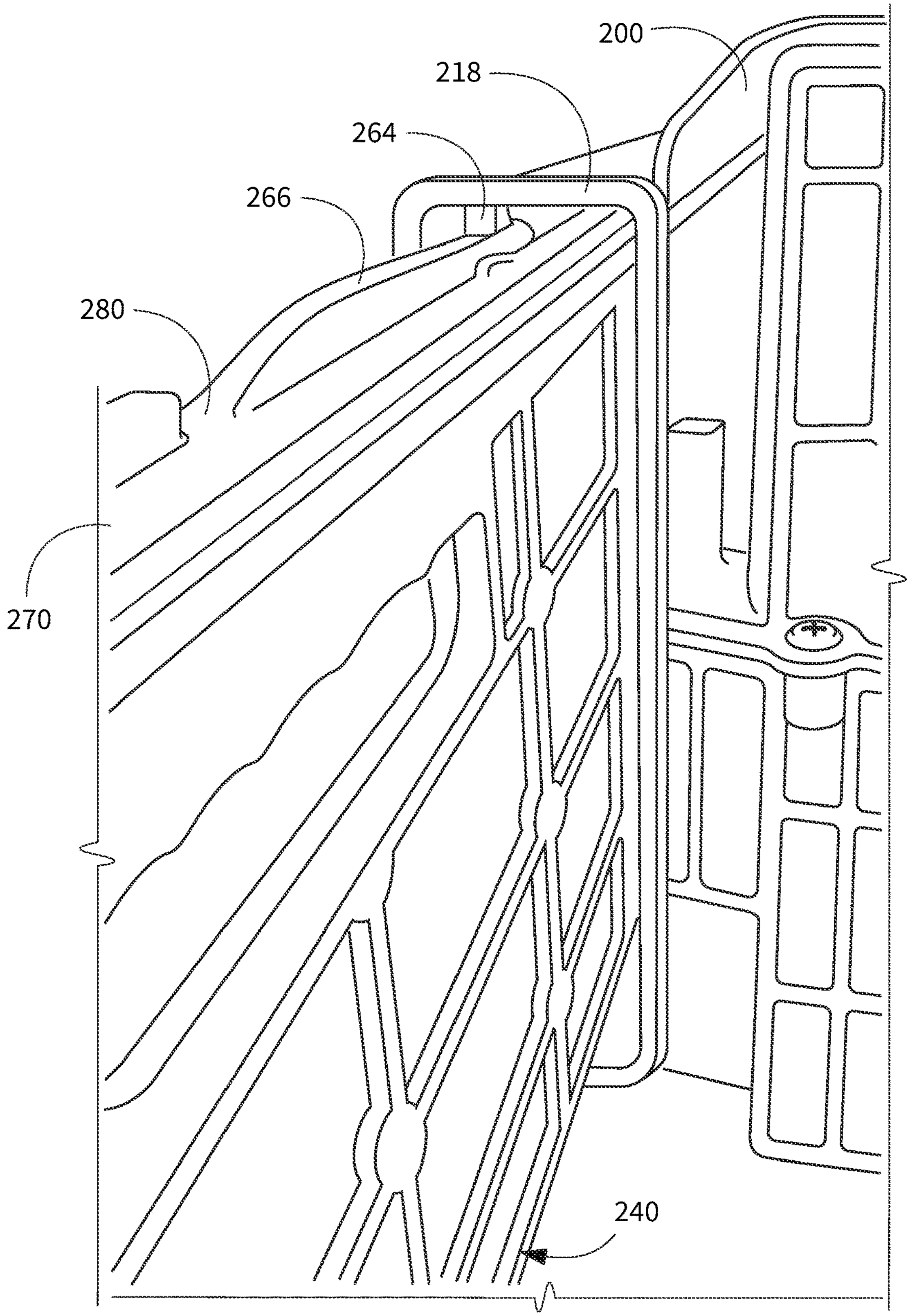
FIG. 13 provides a perspective view of an exemplary housing and an exemplary air filter assembly, where the air filter assembly is partially within and partially outside of the housing.

In FIGS. 10 and 11, the travel direction is left and right on the page, e.g., an insertion direction is to the left and a removal direction is to the right. As may be seen, e.g., in FIGS. 10 and 11, the latch 264 may include an inclined or oblique face and a vertical stop face opposite the oblique face. For example, the inclined or oblique face may be oblique to the vertical direction V and may be oriented towards the insertion direction, and the stop face may extend generally along the vertical direction V. Thus, when the air filter assembly 201 is inserted into the housing 200 with the cantilevered arm 266 in the installation position, the oblique face of the latch 264 encounters the edge of the housing 200 which defines the top of the filter gate 218, whereupon the angle of the oblique face of the latch 264 permits the latch 264 and the arm 266 to deflect downwards, whereby the air filter assembly 201 may be inserted without manually actuating the latch 264. When the air filter assembly 201 is in the installed position within the housing 200, e.g., as seen in FIG. 4, and translates along the travel direction, e.g., in the removal direction, the stop face of the latch 264 engages the housing 200, e.g., at an inside top portion of the filter gate 218, as illustrated in FIG. 13, when the air filter assembly 201 is partially removed from the housing 200. Thus, where the extracted position of the air filter assembly 201 is entirely outside of the housing 200 or at least partially outside of the housing 200, the latch 264 may be configured to releasably engage the housing 200 when the air filter assembly 201 is in an intermediate position between the inserted position and the extracted position along the travel direction, such as about halfway out of the housing 200, e.g., as illustrated in FIG. 13. Accordingly, unintentional removal of the air filter assembly 201 from the housing 200 may be reduced or prevented by the latch 264. In order to fully remove the air filter assembly 201 from the housing 200, the latch 264 may be actuated, e.g., manually, as described above with reference to FIG. 11. For example, as illustrated in FIG. 13, when the air filter assembly 201 is in the intermediate position at which the latch 264 engages the housing 200, e.g., engages the filter gate 218 thereof, at least a portion of the cantilevered arm 266 may be outside of the housing 200 such that a user may access the arm 266 in order to actuate the cantilevered arm 266 and/or the latch 264 thereon and thereby release or unlock the air filter assembly 201 from the housing 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance, comprising:

a cabinet defining an interior volume;

a tub mounted within the interior volume of the cabinet;

a laundry basket rotatably mounted within the tub, the laundry basket defining a chamber for receipt of articles for treatment;

a heating system in thermal communication with the chamber whereby heated air flows from the heating system to the chamber;

a housing positioned within the interior volume of the cabinet; and an air filter assembly removably positioned in the housing between the laundry basket and the heating system upstream of the heating system, whereby a flow of return air from the chamber passes through and is filtered by an air filter of the air filter assembly before flowing to the heating system, the air filter assembly comprising a latch configured to releasably engage the housing, wherein the air filter assembly is configured to translate in a travel direction between an inserted position in the housing and an extracted position at least partially outside of the housing, and wherein the latch is configured to releasably engage the housing when the air filter assembly is in an intermediate position, the intermediate position between the inserted position and the extracted position along the travel direction.

2. The laundry appliance of claim 1, wherein the air filter assembly comprises a shell, and the latch is mounted to the shell.

3. The laundry appliance of claim 2, wherein the latch is integrally formed with the shell.

4. The laundry appliance of claim 2, wherein the latch is defined on a cantilevered arm extending from a flange of the shell.

5. The laundry appliance of claim 4, wherein the cantilevered arm extends generally parallel to the travel direction.

6. The laundry appliance of claim 4, wherein the latch is movable between a locked position wherein the latch engages the housing and a release position which permits removal of the air filter assembly from the housing, further comprising a tongue extending from a free end of the cantilevered arm, the air filter assembly further comprising a retention box defined on the shell, wherein the tongue is positioned in the retention box, whereby a range of travel of the cantilevered arm is constrained.

7. The laundry appliance of claim 1, wherein the latch is movable between a locked position and a release position over an actuation distance, wherein the latch engages the housing when in the locked position and wherein the release position permits removal of the air filter assembly from the housing, wherein the air filter assembly comprises a wall, and wherein the wall defines a lower limit of the actuation distance.

8. The laundry appliance of claim 7, wherein the wall is a first wall, further comprising a second wall generally perpendicular to the first wall, wherein the second wall restricts movement of the latch away from a shell of the air filter assembly.

9. The laundry appliance of claim 8, wherein the first wall adjoins the second wall, whereby the first wall and the second wall at least partially define a retention box of the air filter assembly.

10. A laundry appliance, comprising:

a cabinet defining an interior volume; and an air filter assembly positioned in the cabinet, the air filter assembly comprising a latch configured to releasably engage a housing of the laundry appliance, wherein the air filter assembly comprises a shell, the latch mounted to and integrally formed with the shell.

11. The laundry appliance of claim 10, wherein the air filter assembly is configured to translate in a travel direction between an inserted position in the housing and an extracted position at least partially outside of the housing, and wherein the latch is configured to releasably engage the housing when the air filter assembly is in an intermediate position, the intermediate position between the inserted position and the extracted position along the travel direction.

12. The laundry appliance of claim 10, wherein the latch is defined on a cantilevered arm extending from a flange of the shell.

13. The laundry appliance of claim 12, wherein the air filter assembly is configured to translate in a travel direction between an inserted position in the housing and an extracted position at least partially outside of the housing, and wherein the cantilevered arm extends generally parallel to the travel direction.

14. The laundry appliance of claim 12, wherein the latch is movable between a locked position wherein the latch engages the housing and a release position which permits removal of the air filter assembly from the housing, further comprising a tongue extending from a free end of the cantilevered arm, the air filter assembly further comprising a retention box defined on the shell, wherein the tongue is positioned in the retention box, whereby a range of travel of the cantilevered arm is constrained.

15. The laundry appliance of claim 10, wherein the latch is movable between a locked position and a release position over an actuation distance, wherein the latch engages the housing when in the locked position and wherein the release position permits removal of the air filter assembly from the housing, wherein the air filter assembly comprises a wall, and wherein the wall defines a lower limit of the actuation distance.

16. The laundry appliance of claim 15, wherein the wall is a first wall, further comprising a second wall generally perpendicular to the first wall, wherein the second wall restricts movement of the latch away from a shell of the air filter assembly.

17. The laundry appliance of claim 16, wherein the first wall adjoins the second wall, whereby the first wall and the second wall at least partially define a retention box of the air filter assembly.

* * * * *